United States Patent Office 3,770,686
Patented Nov. 6, 1973

3,770,686
BIS(3,4' - DICARBOXYPHENYL)SULFONE DIAN-HYDRIDE/METAPHENYLENE DIAMINE/OXY-DIANILINE POLYIMIDE PRECURSOR
John A. Torelli, Long Island City, N.Y., assignor to E. I. du Pont de Nemours and Company, Wilmington, Del.
No Drawing. Continuation-in-part of application Ser. No. 54,018, July 10, 1970. This application June 1, 1971, Ser. No. 149,008
Int. Cl. C08g 20/32
U.S. Cl. 260—30.2
6 Claims

ABSTRACT OF THE DISCLOSURE

A coating composition of a polyamic acid prepared from bis(3,4'-dicarboxyphenyl)sulfone dianhydride/metaphenylene diamine and optionally oxydianiline or methylene dianiline in butyrolactone or sulfolane or mixtures thereof which may be cured to a polyamide.

This application is a continuation-in-part of U.S. Ser. No. 54,018, filed July 10, 1970, still pending.

BACKGROUND OF THE INVENTION

The use of polyamic acid in organic solvents to produce polyimide films is well known in the art. However, some such precursor systems present a problem of degradation of the substrate over which they are applied. This may be especially true for a substrate of high temperature resistant fibrous material such as Nomex® aromatic polyamide.

SUMMARY OF THE INVENTION

This invention relates to a polyimide precursor solution consisting of a polyamic acid mixture in gammabutyrolactone, or sulfolane or mixtures thereof.

DESCRIPTION OF THE INVENTION

The present invention is an improved polyimide precursor composition consisting essentially of a polyamic acid prepared by reacting a mixture of bis(3,4-dicarboxyphenyl)sulfone dianhydride (CSDA), and metaphenylene diamine (MPD) and optionally oxydianiline (ODA), or methylene dianiline or mixtures thereof, in gamma-butyrolactone or sulfolane or mixtures thereof.

The polyamic acid precursor composition should be prepared from reactants in about a 1.0/0.5–1.0 mole ratio of CSDA/MPD respectively and optionally up to 0.5 mole ODA. A preferred composition would be about a 1.0/0.3/0.7 mole percent ratio of CSDA/ODA/MPD respectively.

As will be understood this invention also comprehends the above polyamic acid wherein methylene dianiline is substituted in whole or in part for ODA and pyromellitic dianhydride (PMDA) and benzophenone dianhydride replace up to about 10% by weight of the CSDA.

The organic medium of this precursor system is gamma-butyrolactone or sulfolane or mixtures thereof which should comprise from about 50 to 95% by weight of the precursor system (including solvent) with the remainder being the aforementioned polyamic acid of CSDA/ODA/MPD mixture or its equivalents as herein discussed. A preferred amount of gamma-butyrolactone would be about 80% by weight of the precursor system (including solvent).

The use of these particular solvents is helpful to preclude degradation of the polyamic acids or excessive blistering of the polyimide films such as can be experienced with solvents such as N-methyl pyrrolidone. Further these solvents do not adversely affect an aromatic polyamide substrate such as Nomex®.

Addition of up to 3.5 mole percent of [CSA]bis(3,4'-dicarboxyphenyl)sulfone tetracarboxylic acid based on the total amount of CSDA+CSA present may help to control the viscosity of the precursor within the range of about 20 to 40 poises.

The use of the optional amine (oxydianiline or methylene diamine) tends to improve solution stability of the resulting polyamic acid.

UTILITY

The polyimide precursors of this invention can be cured to tough polyimide films by conventional methods such as baking, chemical treatment, etc. This precursor also has other utilities such as varnishes.

PREPARATION

The compositions of this invention are prepared by dissolving an amine in a solvent followed by the incremental addition of a dianhydride, keeping the reaction mixture at a particular temperature range as will be apparent to the skilled artisan. Typical of such conditions are teachings such as those set forth in the prior art in U.S. 3,179,614 and U.S. 3,179,634. Preparation of (CSDA) and (CSA) are known in the art from U.S. 3,022,320. In the examples which follow all parts are by weight unless otherwise indicated.

EXAMPLE 1

180.1 grams (0.3 mole ratio) of oxadianiline and 227.0 grams (0.7 mole ratio) of metaphenylenediamine were added to a three-neck flask equipped with a thermometer. and containing 5928.0 grams of gamma-butyrolactone. 1054.0 grams (0.98 mole ratio) of bis(3,4'-dicarboxyphenyl)sulfone dianhydride were added incrementally to the above mixture keeping the temperature of the resultant mixture at 25° C.±1°C. while utilizing an ice bath. This was followed by the addition of 23.1 grams (0.02 mole ratio) of CSA. The resultant mixture was stirred for one hour. The resultant product was a dark colored viscous liquid. Ten mil films of this liquid were baked at 200° C. for 60 minutes to produce strong, creasable films.

EXAMPLE 2

The procedure of Example 1 was followed except 1075 grams of CSDA were used and the CSA was omitted. The liquid had a viscosity of 110 poises and cured to strong creasable films.

EXAMPLE 3

This procedure could be followed substituting sulfolane for gamma-butyrolactone to produce a varnish suitable for use as a wire coating material.

What is claimed is:

1. A polyimide precursor composition consisting essentially of a polyamic acid which is the reaction product of reactants consisting essentially of bis(3,4'-dicarboxyphenyl)sulfone dianhydride and metaphenylene diamine in a mole ratio of 1.0/0.5–1.0 and on the same basis 0–0.05 mole of at least one member of the group consisting of methylene dianiline and oxydianiline, in a solvent selected from gamma-butyrolactone and sulfolane, said solvent comprising from about 50 to 95% by weight of the polyamic acid and solvent.

2. A polyimide precursor composition of claim 1 wherein the mole percent ratio of bis(3,4'-dicarboxyphenyl)-sulfone dianhydride/oxydianiline/metaphenylene diamine is about 1.0/0.3/0.7 respectively and the solvent is present in an amount of about 80% by weight.

3. The polyimide precursor of claim 1 wherein the solvent is sulfolane.

4. The polyimide precursor of claim 2 wherein the solvent is sulfolane.

5. The polyimide precursor of claim 1 wherein the solvent is gamma-butyrolactone.

6. The polyimide precursor of claim 2 wherein the solvent is gamma-butyrolactone.

References Cited
UNITED STATES PATENTS

| | | | |
|---|---|---|---|
| 3,179,614 | 4/1965 | Edwards | 260—30.2 |
| 3,179,633 | 4/1965 | Endrey | 260—78 |
| 3,179,634 | 4/1965 | Edwards | 260—78 |

LESTER L. LEE, Primary Examiner

U.S. Cl. X.R.

260—30.8 R, 32.2, 47 CD, 78 TF